United States Patent
Berenguer

(10) Patent No.: US 6,927,284 B2
(45) Date of Patent: Aug. 9, 2005

(54) 1:2 METAL COMPLEX DYES, THEIR COMPOSITIONS, THEIR PRODUCTION AND THEIR USE

(75) Inventor: Jordi Berenguer, El Prat de Llobregat (ES)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/492,870

(22) PCT Filed: Oct. 14, 2002

(86) PCT No.: PCT/IB02/04215

§ 371 (c)(1),
(2), (4) Date: Apr. 16, 2004

(87) PCT Pub. No.: WO03/033598

PCT Pub. Date: Apr. 24, 2003

(65) Prior Publication Data

US 2004/0254356 A1 Dec. 16, 2004

(30) Foreign Application Priority Data

Oct. 17, 2001 (GB) .............................................. 0124838
Jul. 26, 2002 (GB) .............................................. 0217320

(51) Int. Cl.⁷ .......................... C09B 45/14; C09B 67/22; D06P 1/10; D06P 3/32
(52) U.S. Cl. ....................... 534/696; 534/720; 534/723; 534/725; 8/437; 8/641
(58) Field of Search ................. 534/696, 720, 534/723, 725; 8/437, 641

(56) References Cited

U.S. PATENT DOCUMENTS

| | | | | |
|---|---|---|---|---|
| 2,943,085 A | | 6/1960 | Oesterlein .................... | 260/146 |
| 3,782,897 A | | 1/1974 | Dore ............................. | 8/43 |
| 4,663,441 A | * | 5/1987 | Grychtol .................... | 534/696 |
| 5,008,379 A | | 4/1991 | Holliger ...................... | 534/684 |
| 5,602,237 A | | 2/1997 | Barra et al. ................ | 534/718 |

FOREIGN PATENT DOCUMENTS

| | | |
|---|---|---|
| BE | 571 945 | 4/1962 |
| DE | 742 646 | 10/1943 |
| DE | 2 126 814 | 12/1971 |
| DE | 44 07 802 | 9/1994 |
| EP | 0 175 324 | 3/1986 |
| JP | 2002020659 | * 1/2002 |

OTHER PUBLICATIONS

Zdarsa et al., Chemical Abstracts 108:114200, 1988.*
English abstract for DE 742 646.
English abstract for CS 239,463.
English abstract for DE 44 07 802.

* cited by examiner

Primary Examiner—Fiona T. Powers
(74) Attorney, Agent, or Firm—Tod A. Waldrop

(57) ABSTRACT

1:2-metal complex dyes of the formula

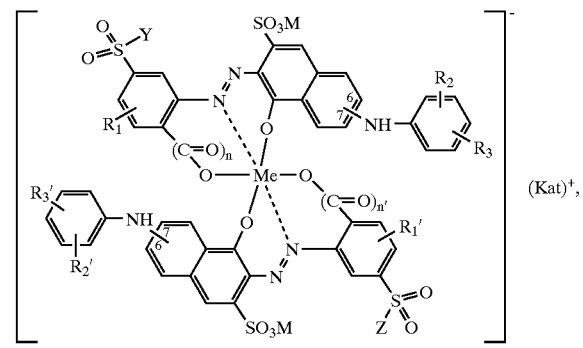

(I)

wherein the symbols $R_1$, $R_1'$, $R_2$, $R_2'$, $R_3$, $R_3'$, Y, Z, n, n', Me, M and $(Kat)^+$ are defined as in the Claims, mixtures thereof, their compositions, their production and their use as anionic dyes for dyeing substrates, especially leather, in brown to red shades.

14 Claims, No Drawings

1:2 METAL COMPLEX DYES, THEIR COMPOSITIONS, THEIR PRODUCTION AND THEIR USE

In CS 239463 B1 is described a process for the synthesis of metal complexes in which an EDTA-metal complex of Cr, Co, Cu or Fe is employed as a reactant for metallization of various azo dye complexants. In Example 5 there is described the synthesis of Saturn Violet LRL by metallisation of the monoazo compound 2-aminophenol-4-suphonamide→phenyl-1-acid with the EDTA-Cu complex produced by reaction of copper sulphate with tetrasodium ethylenediaminetetra-acetate, and in the "Chemical Abstract" of this document (C.A. 108:114200) there is indicated the symmetrical 1:2 chromium complex of this monoazo compound.

It has now been found that particular monoazo dye metal complexes as defined below have surprisingly good properties as anionic dyestuffs, especially for the dyeing of leather and pelts.

The invention relates to 1:2 metal complex dyes and mixed complexes, their compositions, their production and their use as anionic dyes, especially for dyeing leather.

The invention thus firstly provides a 1:2-metal complex dye of the formula

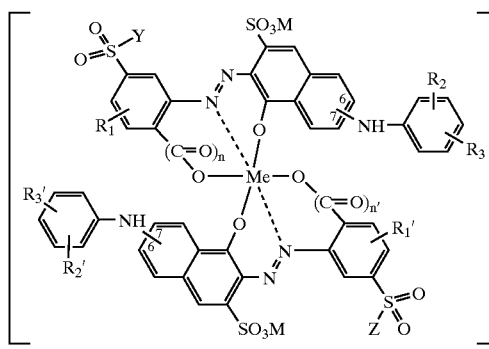

(I)

wherein $R_1$ signifies H, —$NO_2$, —$SO_3M$ or —$NH(C_{1-2}$-alkyl), $R_2$ signifies H, substituted $C_{1-4}$-alkyl, unsubstituted $C_{1-4}$-alkyl, —$NO_2$, —$NH_2$ or —OH, $R_3$ signifies H, substituted $C_{1-4}$-alkyl, unsubstituted $C_{1-4}$-alkyl, —$NO_2$, —$NH_2$ or —OH, $R'_1$ signifies H, —$NO_2$, —$SO_3M$ or —$NH(C_{1-2}$-alkyl), $R'_2$ signifies H, substituted $C_{1-4}$-alkyl, unsubstituted $C_{1-4}$-alkyl, —$NO_2$, —$NH_2$ or —OH, $R'_3$ signifies H, substituted $C_{1-4}$-alkyl, unsubstituted $C_{1-4}$-alkyl, —$NO_2$, —$NH_2$ or —OH, Y signifies —OM or —$NR_4R_5$, Z signifies —OM or —$NR'_4R'_5$, $R_4$ signifies H, $C_{1-4}$-alkyl, a substituted aromatic ring or an unsubstituted aromatic ring, $R'_4$ signifies H, $C_{1-4}$-alkyl, a substituted aromatic ring or an unsubstituted aromatic ring, $R_5$ signifies H, $C_{1-4}$-alkyl, a substituted aromatic ring or an unsubstituted aromatic ring, $R'_5$ signifies H, $C_{1-4}$-alkyl, a substituted aromatic ring or an unsubstituted aromatic ring, n signifies 0 or 1, n' signifies 0 or 1, M signifies hydrogen or a cation, (Kat)$^+$ signifies a counter-ion and Me signifies a complex-forming metal, with the proviso that if Y and Z signify both —$NH_2$, Me does not signify Cr, and mixtures of two or more thereof.

The compounds of the invention may be produced by synthetic processes analogous to known processes, i.e. by diazotization, coupling and metallization reactions and optionally other modification reactions as required.

More particularly, the process for the production of the 1:2 metal complexes of the invention is characterized in that at least one monoazocompound of formula

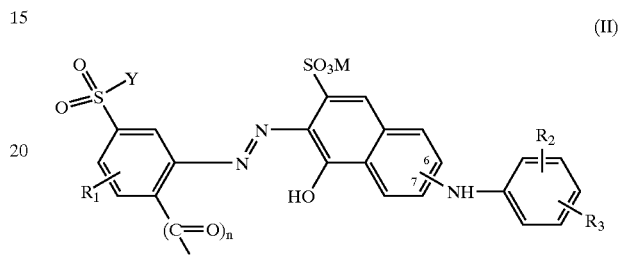

(II)

and at least one monoazo-compound of formula

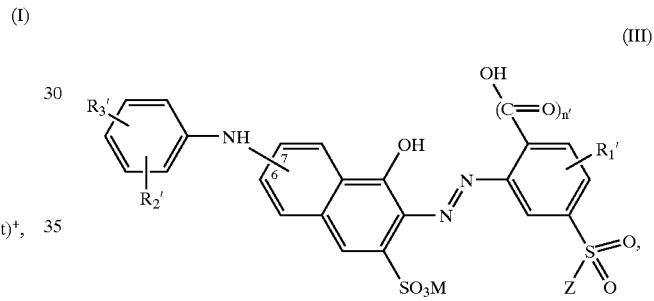

(III)

in which, when n or n' is 1, the carboxy group may optionally be in salt form, are metallized with at least one 1:2-complex-forming metal compound.

The compounds of formula (II) are known or may be produced by known methods conventional per se, by coupling the diazocompound of an amine of formula

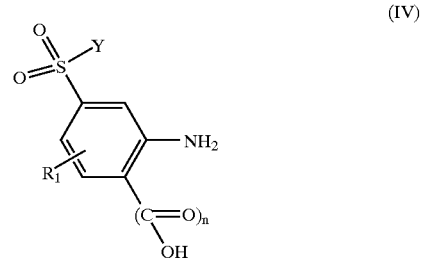

(IV)

to a coupling component of formula

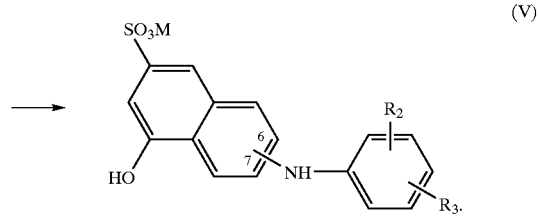

(V)

Analogously the compounds of formula (III) are known or may be produced by known methods conventional per se, by coupling the diazocompound of an amine of formula

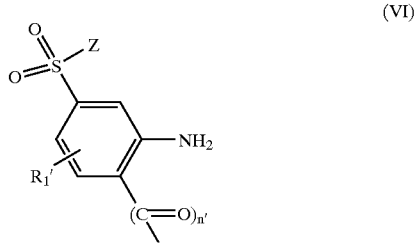

(VI)

to a coupling component of formula

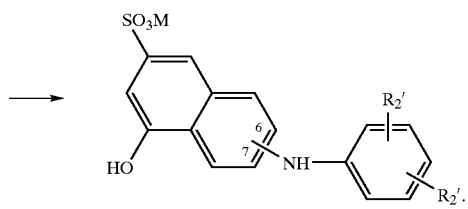

(VII)

Diazotization of amines of formulae (IV) and (VI) may be carried out under conventional conditions, in particular with a nitrite (preferably sodium nitrite) in acidic aqueous medium (preferably in the presence of hydrochloric acid) and at low temperatures, e.g. in the range of −5° C. to +10° C., preferably 0° to 5° C.

The coupling reactions of the diazonium compounds to the respective coupling components may also be carried out in a manner conventional per se, advantageously at temperatures in the range of −5° C. to +30° C., preferably below 25° C. The coupling of the diazo compounds to the compounds of formulae (V) or respectively (VII) may be carried out under distinctly basic pH conditions, preferably at a pH in the range of 8 to 11.5, preferably 9.5 to 11.5.

The reactions may be carried out in aqueous medium or also in aqueous/organic medium, the organic medium being preferably a water-miscible inert solvent (e.g. an alcohol or dioxane), preferably in only aqueous medium.

The compounds of formulae (V) and (VII) are known or may be synthetised by known methods by arylation of γ-acid or J-acid.

Where in the significance of any of $R_2$, $R_3$, $R_2'$ or $R_3'$ an alkyl radical is substituted, the substituents may be selected from known substituents conventional in the art of azo dyes, e.g. from —OH, $C_{1-2}$-alkoxy, —$NH_2$, —CN, —$COOM_1$ and —$SO_3M$. $M_1$ signifies hydrogen or has one of the significances of M. Preferably any alkyl radical in the significance of any of $R_2$, $R_3$, $R_2'$ or $R_3'$ is unsubstituted.

The $C_{3-4}$-alkyl radicals may be linear or branched. Among the $C_{1-4}$-alkyl radicals the lower molecular ones are preferred, in particular ethyl and especially methyl.

If $R_4$, $R_4'$, $R_5$ or $R_5'$ signifies an unsubstituted or substituted aromatic ring, this ring preferably is a benzene ring and the substituents may be selected from known substituents conventional in the art of azo dyes, e.g. from $C_{1-2}$-alkyl, —OH, $C_{1-2}$-alkoxy, —$NH_2$, —CN, —$COOM_1$ and —$SO_3M$; preferably such optionally substituted aromatic radical is a radical of formula

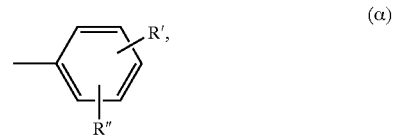

(α)

wherein

R' signifies hydrogen, $C_{1-2}$-alkyl, —OH, $C_{1-2}$-alkoxy, —$NH_2$, —CN, —$COOM_1$ or —$SO_3M$ and R" signifies hydrogen or $C_{1-2}$-alkyl.

R" preferably signifies hydrogen.

R' preferably signifies hydrogen or —$COOM_1$.

$R_1$ preferably is in ortho-position with reference to —$(CO)_n$—O—. Preferably $R_1$ signifies hydrogen or —$NO_2$, more preferably hydrogen.

$R_1'$ preferably is in ortho-position with reference to —$(CO)_n$—O—. Preferably $R_1'$ signifies hydrogen or —$NO_2$, more preferably hydrogen.

$R_2$ and $R_3$ may be in any of the available positions of the phenyl ring, $R_3$ preferably is in para-position with reference to the —NH— bridge linked to the naphthalene radical, and $R_2$ is in any of the other available positions. Preferably at most one of $R_2$ and $R_3$ signifies —OH or —$NH_2$. Preferably $R_3$ signifies hydrogen, —$NH_2$, —OH or —$NO_2$, more preferably hydrogen or —$NO_2$. $R_2$ most preferably signifies hydrogen.

$R_2'$ and $R_3'$ may be in any of the available positions of the phenyl ring, $R_3'$ preferably is in para-position with reference to the —NH— bridge linked to the naphthalene radical, and $R_2'$ is in any of the other available positions. Preferably at most one of $R_2'$ and $R_3'$ signifies —OH or —$NH_2$. Preferably $R_3'$ signifies hydrogen, —$NH_2$, —OH or —$NO_2$, more preferably hydrogen or —$NO_2$. $R_2'$ most preferably signifies hydrogen.

$R_4$ and $R_5$ may have equal or different significances. $R_4$ preferably signifies hydrogen, $C_{1-2}$-alkyl or a radical of formula (α). $R_5$ preferably signifies hydrogen or $C_{1-2}$-alkyl, more preferably hydrogen.

$R_4'$ and $R_5'$ may have equal or different significances. $R_4'$ preferably signifies hydrogen, $C_{1-2}$-alkyl or a radical of formula (α). $R_5'$ preferably signifies hydrogen or $C_{1-2}$-alkyl, more preferably hydrogen.

Preferably Y and Z do not signify both OM or both $NH_2$.

Y preferably signifies —OM or —$NHR_4"$, and $R_4"$ signifies hydrogen, methyl or a radical of formula

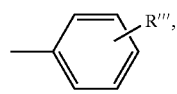 (α')

in which R''' signifiies hydrogen or —COOM$_1$.

Z preferably signifies —NHR$_4$, more preferably —NHR$_4$", in which R$_4$" is as defined above and, if the molecule contains two groups of formula —NHR$_4$", the two R$_4$" may have equal or different significances. Preferably, if Y and Z signify both a group —NHR$_4$", at most one of the two R$_4$" signifies a radical of formula (α) or (α'); more preferably one of the two R$_4$" signifies hydrogen and the other signifies C$_{1-4}$-alkyl or a radical of formula (α), most preferably methyl or a radical of formula (α'). Particularly preferably Y signifies —OM or —NH$_2$ and Z signifies a group —NHR$_4$", in which, if Y signifies —NH$_2$, R$_4$" in Z does not signify hydrogen.

Where M signifies a cation this may be any cation conventional per se in anionic metal complex dyes, conveniently a non-chromophoric cation, in particular an alkali metal cation (especially lithium, sodium or/and potassium) or an ammonium cation (e.g. unsubstituted ammonium or ammonium mono-, di- or tri-substituted with C$_{1-2}$-alkyl or/and C$_{2-3}$-hydroxyalkyl), alkali metal cations being preferred. The metal complex dyes of the invention may advantageously also be in partial salt form, i.e. where some of the M are salt-forming cations and some are hydrogen (or hydronium). (Kat)$^+$ may be any cation as is formed in the synthesis of the metal complex dye, e.g. as indicated above for M, and depends thus also on Me and further also on the complex forming reaction conditions (namely the pH and the employed solvent), or a cation introduced by ion exchange; in the free acid form it is indicated as a hydronium ion. Similarly, M$_1$ may be hydrogen or any cation as is formed in the synthesis of the metal complex dye, depending also on the complex forming reaction conditions (namely the pH and the employed solvent), or a cation introduced by ion exchange, analogously as indicated above for M.

The radicals of formulae

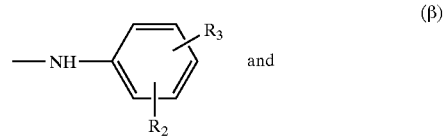 (β)

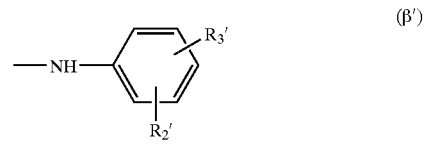 (β')

may be linked to the 6- or 7-position of the respective naphthalene nucleus, of which position 6 is preferred.

The 1:2 complex-forming metal Me may be any suitable metal, i.e. any metal suitable for 1:2 metal complex formation, in particular chromium, cobalt, iron, manganese, titanium, zirconium (also zirconyl) or/and aluminium, of which are preferred chromium, cobalt and iron, especially cobalt and/or iron.

Preferred 1:2 metal complexes of the invention are those of formula

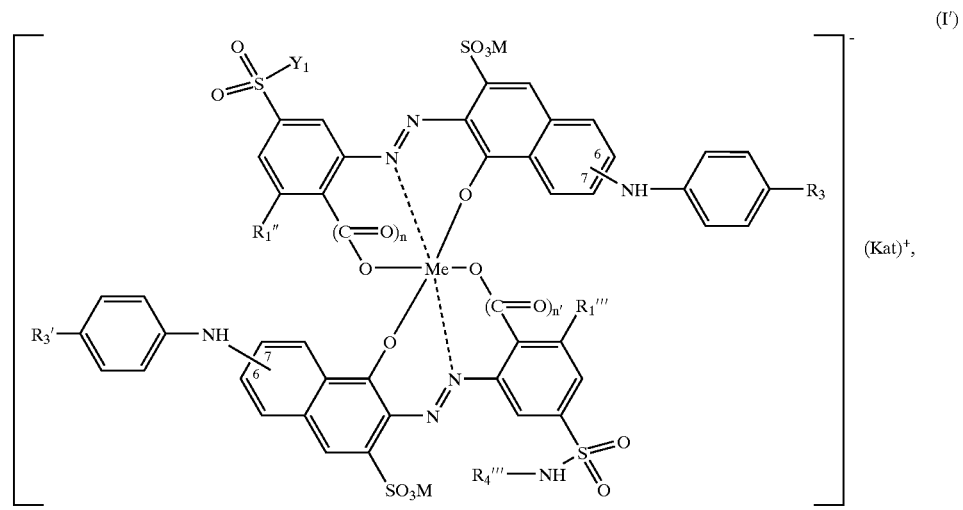 (I')

(Kat)$^+$, in which
$Y_1$ signifies —OM or —NHR$_4$,
$R_1''$ signifies hydrogen or —NO$_2$,
$R_1'''$ signifies hydrogen or —NO$_2$ and
$R_4'''$ has independently from $R_4$ one of the significances of $R_4$, provided that, if $Y_1$ signifies —NH$_2$, $R_4'''$ does not signify hydrogen, and that if $Y_1$ signifies —NHR$_4$, at most one of $R_4'''$ and $R_4$ signifies a radical of formula (α), especially those of formula

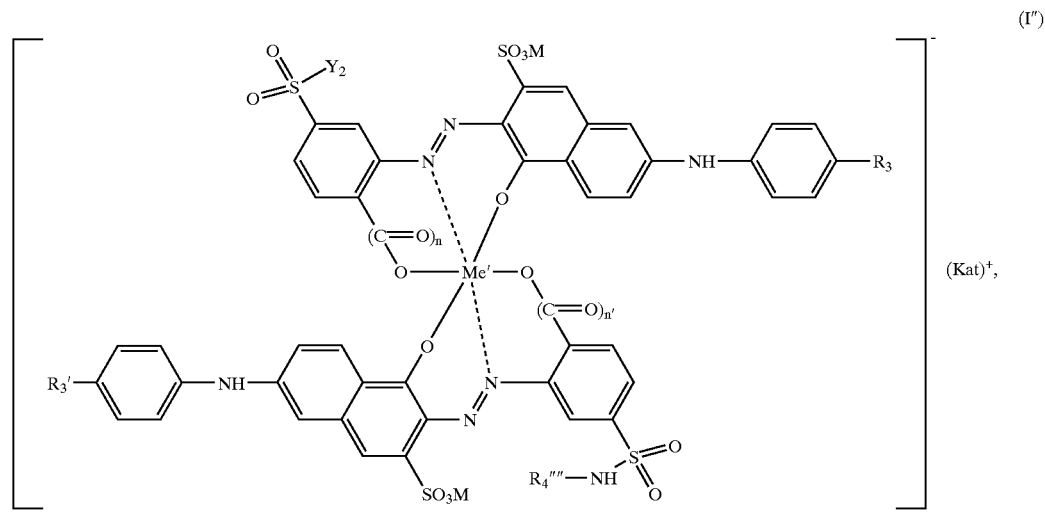

in which
Me' signifies Cr, Co or Fe,
$Y_2$ signifies —OM or —NHR$_4''$ and
$R_4''''$ has independently from $R_4''$ one of the significances of $R_4''$, provided that, if $Y_2$ signifies —NH$_2$, $R_4''''$ does not signify hydrogen, and that if $Y_2$ signifies —NHR$_4''$, at most one of $R_4''''$ and $R_4''$ signifies a radical of formula (α').

The metal complexes of formula (I) may be synthetized by metallizing the respective compounds of formulae (II) and (III). The metallization to the metal complexes may be carried out in analogy to known metal complex formation reactions.

For the metallization of the compounds of formulae (II) and (III) there may be employed conventional suitable complex-forming metal compounds, in particular salts, e.g. acetates or hydrosoluble salts of mineral acids, in particular chromium trichloride, cobalt dichloride, iron di- or trichloride, chromium trifluoride, manganese chloride, acetate or sulphate, aluminium chloride, titanium chloride, zirconium tetrachloride or sulphate, zirconyl chloride, cobalt sulphate or nitrate, iron-II- or -III-sulphate, chromium sulphate, chromium or cobalt acetate, potassium chromium sulphate, ammonium chromium sulphate (e.g. chrome alums) and optionally, with the addition of a reducing agent e.g. of glucose, also sodium or potassium chromate or bichromate.

Chromation may be carried out directly up to the 1:2 chromium complex stage or—especially for the production of asymmetrical 1:2 Cr complexes —by degrees over the 1:1 chromium complex stage and then further complexation up to the 1:2 chromium complex stage.

Chromation may be carried out in aqueous medium, preferably at pH values in the range of 2 to 10 and temperatures in the range of 95 to 130° C., if necessary under superatmospheric pressure. Optionally the reaction may be carried out with addition of organic solvents or also only in organic solvents. Suitable organic solvents are preferably those that are miscible with water, have a boiling point above 100° C. and in which the azo dyes and the metal salts are soluble, e.g. glycols, ether alcohols or amides (e.g. ethylene glycol, polyethylene glycol, β-ethoxyethanol, β-methoxy-ethanol, formamide or dimethylformamide). For the production of asymmetrical 1:2 chromium complex compounds the chromation may be carried out gradually, synthetizing first the 1:1 chromium complex of one of the complexants and then synthetizing from this with a second complexant the 1:2 complex. The 1:1 chromium complexes may be produced in conventional manner, e.g. under analogous conditions as for the 1:2 chromium complexes, but preferably under stronger acidic pH-values, advantageously at pH<3. It is however also of advantage to synthesize 1:2 chromium mixed complexes, e.g. by simultaneously metallizing complexants of formulae (II) and (III) different from each other.

The metallization of azocompounds of formulae (II) and (III) to the respective iron-complexes, i.e. 1:2 iron complexes, may be carried out in conventional manner, suitably in aqueous medium, advantageously at pH-values in the range of 3.5 to 7, preferably 4.5 to 6, with heating. Preferably the metallization to iron complexes is carried out at temperatures in the range of 40° C. to reflux temperature, preferably 50° to 100° C.

The metallization of azocompounds of formulae (II) and (III) to the corresponding 1:2-cobalt complexes, may be carried out in conventional manner, suitably in aqueous medium, advantageously at pH-values in the range of 8 to 12, preferably 10 to 11, optionally with heating. Preferably the metallization to cobalt complexes is carried out at temperatures in the range of 40° C. to 90° C., preferably 50° to 70° C.

Where a metal compound of a metal cation in bivalent form $Me^{2+}$ is used for complex formation, an oxidising agent, e.g. $H_2O_2$, may be added in order to optimise the yield of complex formation of the metal with degree of oxidation=3 (=$Me^{3+}$).

Other metallizations may be carried out in analogous way, as conventional per se.

Preference is given to 1:2 metal complexes of asymmetrical constitution, i.e. of formula (I) in which the radicals of the complexants of formulae (II) and (III) are different from each other, i.e. in which the position or/and the significance of $R_1$ is different from the one of $R_1'$ and/or the position or/and the significance of $R_2$ is different from the one of $R_2'$ and/or the position or/and the significance of $R_3$ is different from the one of $R_3'$ and/or the significance of n is different from the one of n' and/or the position of the radical of formula (β) is different from the one of the radical of formula (β').

According to a preferred feature of the invention the radicals of formulae (β) and (β') and their positions are equal, while the radicals of the diazo components—i.e. of those of formulae (IV) and (VI)—are different, preferably by Y being different from Z, while $R_1$ may have the same significance and position as $R_1'$ and also n may be =n'.

Preferred complexes of formula (I') are those in which $R_1''$ and $R_1'''$ signify hydrogen and $Y_1$ signifies —OM or —$NH_2$, and preferred complexes of formula (I'') are those in which $Y_2$ signifies —OM or —$NH_2$.

According to a further preferred feature of the invention there are produced mixed 1:2 metal complexes by metallising a mixture of two or more different monoazocompounds of formulae (II) and (III), so that there are formed statistical mixtures of the corresponding asymmetrical 1:2 metal complex of formula (I) with the respective symmetrical 1:2 metal complex of a dye of formula (II) and the one of a dye of formula (III). In such mixtures of asymmetrical and symmetrical complexes the proportion of asymmetrical complex present may vary depending on the metallisation reaction conditions, e.g. in the range of 20 to 80 mol-% of the total metal complex mixture, usually 30 to 75 mol-%, mostly 40 to 70 mol-%.

According to a still further preferred feature of the invention there are produced mixed-metal complexes by metallising the respective monoazocompounds of formulae (II) and (III) with two or more different complex-forming metals, so that there are formed corresponding statistical mixtures of the 1:2 metal complexes of formula (I) in which Me has two or more different significances. This may be accomplished either by using mixtures of two or more different complex forming metal compounds or preferably by consecutive stepwise metallization with two or more different complex forming metal compounds, i.e. complex forming compounds of two or more complex forming metals Me, and at the same reaction conditions as used for the individual metal complex formation as described above.

The equivalents ratio of complex forming metal compounds referred to complex forming metal in the production of these mixed-metal complexes may vary broadly, i.e. <100% of the stoichiometric or calculated quantity required for full 1:2 metallization, e.g. from 2 to 98%, or even 40 to 95%—e.g. 50%—, of a metal $Me_1$, and the remainder, e.g. 2 to 98%, or even 60 to 5%—e.g. 50%—, of one or more other metals, in particular of a metal $Me_2$. For this purpose $Me_1$ preferably is chromium or cobalt and $Me_2$ preferably is aluminium or iron, or, if $Me_1$ is chromium, $Me_2$ may also be cobalt, or conversely, if $Me_1$ is cobalt, $Me_2$ may also be chromium. Most preferably $Me_1$ is cobalt and $Me_2$ is iron or chromium. One equivalent of complex forming metal compound referred to complex forming metal Me is one mole of complex forming metal compound divided by the number of metal atoms Me present in ionic form in the complex forming metal compound. The calculated quantity of complex forming metal compound required for full 1:2 metallization may vary slightly from the stoichiometric one, by including a certain proportion that may be involved in an accompanying non-complex-forming side reaction, and may vary depending on the kind of involved products and on the reaction conditions. The required calculated quantity may thus e.g. be in excess of about 0.5 to 15% mostly 1 to 12% over the stoichiometric one.

For example, if a metal complex mixture of 50 mol-% 1:2 Co complex and 50 mol-% Fe complex is desired, first 50% of the stoichiometric or calculated amount of cobalt (i.e. 50% of the amount of cobalt required for full 1:2-cobalt complex formation) as cobalt sulphate is added at a pH in the range of 8.0 to 12.0 and at a temperature in the range of 40 to 90° C. After 1 hour stirring, the pH is lowered with hydrochloric acid up to 4.0 to 7.0 and 50% of the stoichiometric or calculated amount of iron (i.e. 50% of the amount of iron required for full 1:2-iron complex formation) as iron chloride is added and the reaction mixture is stirred during 1 hour at a pH in the range of 4.0 to 7.0 and a temperature in the range of 50 to 90° C.

Upon completion of the required coupling and metallization reactions the obtained dyes or mixtures thereof may be isolated from the mother-liquor in a manner conventional per se, e.g. by salting-out or by acidification with a strong mineral acid or e.g. by evaporation, upon dialysis with a suitable membrane. If desired, the dye may, upon isolation or dialysis, be blended with suitable blending agents conventional per se, e.g. with alkali metal salts (sodium carbonate, sodium sulphate or sodium chloride), with non-electrolyte blending agents (mainly urea or/and oligosaccharides, e.g. dextrin) or/and with anionic surfactants, in particular hydrocarbon sulphonates or other organic sulphonates, e.g. sulphonated castor oil, sulphosuccinates or lignin sulphonate. If a surfactant is employed, the weight ratio of the surfactant to the dye is advantageously in the range of 5:95 to 40:60. If desired, especially if the composition contains an anionic surfactant, as indicated above, it may be formulated with water as concentrated liquid dye compositions, preferably with a dry-substance content in the range of 10 to 70%, more preferably 20 to 50% by weight, referred to the weight of the composition.

The 1:2 metal complex dyes of the invention distinguish by their solubility and stability properties even in aqueous solution. They serve as anionic dyes and are suitable for dyeing substrates that are dyeable with anionic dyes.

Any substrate that is dyeable with anionic dyes is suitable as a substrate that may be dyed with the metal complexes of the invention, these include natural and regenerated cellulose, polyurethanes, basically modified high polymers (e.g. basically modified polypropylene), natural or synthetic polyamides or anodised aluminium, in particular, however, leather substrates. The substrate to be dyed may be in any conventional form, e.g. in the form of loose fibres, filaments, yarns, woven or knitted goods, non-woven webs, carpets, half-ready-made and ready-made soft goods and tanned leather or pelts. The dyes may be employed in any desired concentration up to the saturation of the substrate. The dyeing may be carried out by any conventional method that is suitable for the substrate to be dyed, e.g. by exhaustion or impregnation methods (e.g. padding or printing), preferably from aqueous medium; for synthetic substrates, the dye may optionally also be incorporated into the synthetic mass. Paper may be dyed in the pulp or after sheet formation.

The dyes of the invention are, however, mainly suitable for the dyeing of leather and pelts.

Any kinds of leather which are conventionally dyed from aqueous medium are suitable, particularly grain leather (e.g. nappa from sheep, goat or cow, and box-leather from calf or cow) suede leather (e.g. velours from sheep, goat or calf and hunting leather), split velours (e.g. from cow or calf skin), buckskin and nubuk leather; further also woolled skins and furs (e.g. woolled suede leather). The leather may have been tanned by any conventional tanning method, in particular vegetable, mineral synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents [e.g. chromium, zirconyl or aluminium derivatives, oak, quebracho, chestnut or mimosa extracts, aromatic syntans, polyurethanes (co)-polymers of (meth)acrylic acid compounds or melamine/, dicyanodiamide/ and/or urea/-formaldehyde resins].

The leathers may be of various thicknesses, thus, there may be used very thin leathers, such as book-binder's leather or glove-leather (nappa), leather of medium thickness, such as shoe upper leather, garment leather and leather for handbags or also thick leathers, such as shoe-sole leather, furniture leather, leather for suitcases, for belts and for sport articles; woolled leathers and furs may also be used. After tanning (in particular after a retanning) and before dyeing, the pH of the leather is advantageously set to values in the range of 4.0–8.0 (the leather is "neutralised"); depending on the kind of the leather, there may be chosen an optimum pH range, e.g. for grain leather pH values in the range of 4.0–6.0, for suede leather and split velours and for very thin leathers pH-values in the range of 4.5 to 8.0 and for intermediately dried suede leathers and intermediately dried split velours, the pH may range in the range of 5.0–8.0. For the adjustment of the pH-value of the leather there may be employed conventional assistants; for tanned leather of acidic character the pH may be adjusted by addition of suitable bases, e.g. ammonia, ammonium bicarbonate or alkali metal salts of weak acids, e.g. sodium formate, sodium acetate, sodium bicarbonate, sodium carbonate or sodium bisulphite, of which sodium formate and ammonia are preferred. Sodium carbonate and sodium bicarbonate are usable in particular as second bases for the exact adjustment of the superficial pH-value of the leather. Mineral tanned leather may, if desired, also be masked, e.g. with alkali metal formate, oxalate or polyphosphate or e.g. with titanium/potassium oxalate.

The dyeing may be carried out in a manner known per se, suitably in an aqueous medium and under conventional temperature and pH conditions, e.g. in the temperature range of 20° C.–80° C., preferably 25° C.–70° C., milder temperature conditions, in particular in the range of 25° C.–40° C., being preferred for the achievement of deeper penetrations and for the dyeing of woolled skins and furs. The pH-values of the dye-bath may, in general, range broadly; mainly from pH 9 to pH 3; in general the dyeing may be advantageously begun at higher pH-values and concluded at lower pH-values. Preferably the dyeing is carried out at pH-values $\leq 4$, in particular in the range of 9 to 4 and for the conclusion of the dyeing procedure the pH-value is lowered (e.g. by addition of an acid conventional in the leather dyeing technique such as acetic acid or formic acid) preferably to values in the range between 4 and 3. The dye concentration may range broadly, if desired, up to the saturation degree of the substrate, e.g. up to 5%, referred to the wet weight of the substrate. The dyeing may be carried out in one or more stages, e.g. in two stages, optionally with insertion of charge reversal of the substrate by means of conventional cationic assistants. If desired, the dyeing may be carried out in the presence of a dyeing assistant; these are mainly conventional non-ionic or anionic products (in particular hydrophilic surfactants, preferably hydrophilic polysaccharide derivatives, polyoxyethylated alkyl phenols, ligno-sulphonates or sulpho-group containing aromatic compounds). Since the dyes of the invention distinguish by their surprisingly good fastness to acids, neither the dyeing procedure nor the dyeing are impaired by any required acid addition during the dyeing or also afterwards (the obtained dyeings are e.g. also suitable as substrates for after-treatments and finishings under acidic conditions).

A fatting may, if desired, be carried out before and/or after the dyeing process, in particular also in the same liquor. For fatting after the dyeing process the fatting agent is advantageously added before the pH of the liquor is lowered, preferably to values between 3 and 4.

For the fatting (in particular fat-liquoring) step there may be used any conventional natural animal, vegetable or mineral fat, fat oil, wax, resin or resin-oil or chemically modified animal or vegetable fat or oil, which include in particular tallow, fish oils, neats-foot oil, olive oil, castor oil, rapeseed oil, linseed oil, wood oil, cottonseed oil, sesame oil, corn oil and Japanese tallow and chemically modified products thereof (e.g. hydrolysis, transesterification, oxidation, hydrogenation or sulphonation products), bees-wax, Chinese wax, carnauba wax, montan wax, wool fat, colophony, birch oil, shellack, mineral oils with boiling range within 300° C. and 370° C. (particularly the so-called "heavy alkylates"), soft paraffin, medium paraffin, hard paraffin, vaseline, ceresin and methyl esters of $C_{14-22}$-fatty acids; and synthetic leather fatting agents, including esters, in particular esters of polybasic acids (e.g. phosphoric acid) with optionally oxyethylated fatty alcohols. Of the above the mentioned methyl esters, sulphonation products and phosphoric acid partial esters are particularly preferred. By the term "sulphonation" for the fatting agents, there is meant generally the introduction of a sulpho group including also the formation of a sulphato group (="sulphating") and the introduction of a sulpho group by reaction with a sulphite or $SO_2$ (="sulphiting").

A conventional leather softener, in particular a cationic leather softener may, if desired, be applied in a final step, particularly if fatting has been carried out with a sulphonated fat-liquoring agent.

The treated substrate may then be further treated in conventional manner, e.g. rinsed or washed, drained, dried and cured.

A further embodiment of the present invention is a substrate dyed by a process using compounds of formula (I) or mixtures thereof.

The 1:2-metal complex dyes of the invention are, especially in the form of their alkali metal salts, readily soluble in water; they display surprisingly good fastness to acids and are distinguished especially on leather by their good build-up, good penetration dyeings of the leathers being also obtainable. The dyeings particularly on leather, have excellent fastness properties, for example wet-fastnesses, fastness to rubbing and to dry cleaning and above all fastness to acids, light-fastness and stability to PVC-migration are to be pointed out. There may be obtained very level, intense, fine dyeings in brown to red shades, in particular reddish brown to brownish red, especially also bordeaux dyeings, grain side and velours side being very evenly dyed. The dye exhaustion of the dye bath is also satisfactory. The 1:2 metal complex dyes of the invention may also be employed in admixture with other dyes of different shade and similar coloristic behavior, mainly 1:2 metal complexes of mono- or/and disazodyes, e.g. those described in U.S. Pat. Nos. 5,602,237, 5,008,379 and/or DE-A-4407802, to give dye mixtures and dyeings of corresponding combined shades. In admixture with such dyes with which the dyes of the invention are combinable, there may also be obtained very intense and regular dyeings of high yield and optimum fastnesses.

In the following examples parts and percentages are, if not otherwise stated, by weight; the temperatures are indicated in degrees Celsius and parts by volume relate to parts by weight as ml to g. Where it is stated that a compound is diazotised in a conventional way, there are meant diazotisation reaction conditions as described above (i.e. with sodium nitrite in aqueous acidic medium in the presence of hydrochloric acid, at 0–5° C.). The reactants employed in the synthetic examples and the components employed in the Application Examples, other than the dyes of the invention, are commercially available products.

EXAMPLE 1

18.8 parts of 1-hydroxy-2-amino-4-benzenesulphonic acid and 20.1 parts of 1-hydroxy-2-amino-4-benzenemethylsulfonamide are diazotized in a conventional way and coupled to 73 parts of phenyl-J-acid dissolved in 500 parts of water at pH 10.0–11.0 (set with NaOH). Once the coupling is complete, the solution is heated to 60° C. and 28 parts of cobalt sulphate heptahydrate is added, keeping the pH>10.0 with the addition of 20 parts of sodium hydroxide 25% solution. The reaction mixture is held at this temperature with stirring until the cobaltation reaction is completed. Finally the Co-complex dye is salted out, suction filtered and dried. There are obtained 200 parts of a powder that dyes leather in a bordeaux shade. The dye is a mixture of symmetric and asymmetric cobalt complexes, in which the asymmetric complex preponderates and corresponds in the form of the free acid to the formula:

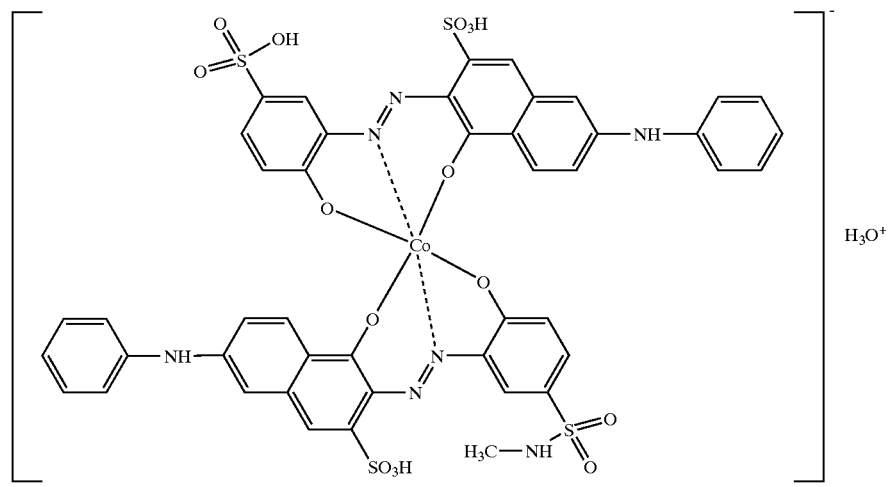

and the symmetric ones correspond in the form of the free acids to the formulae

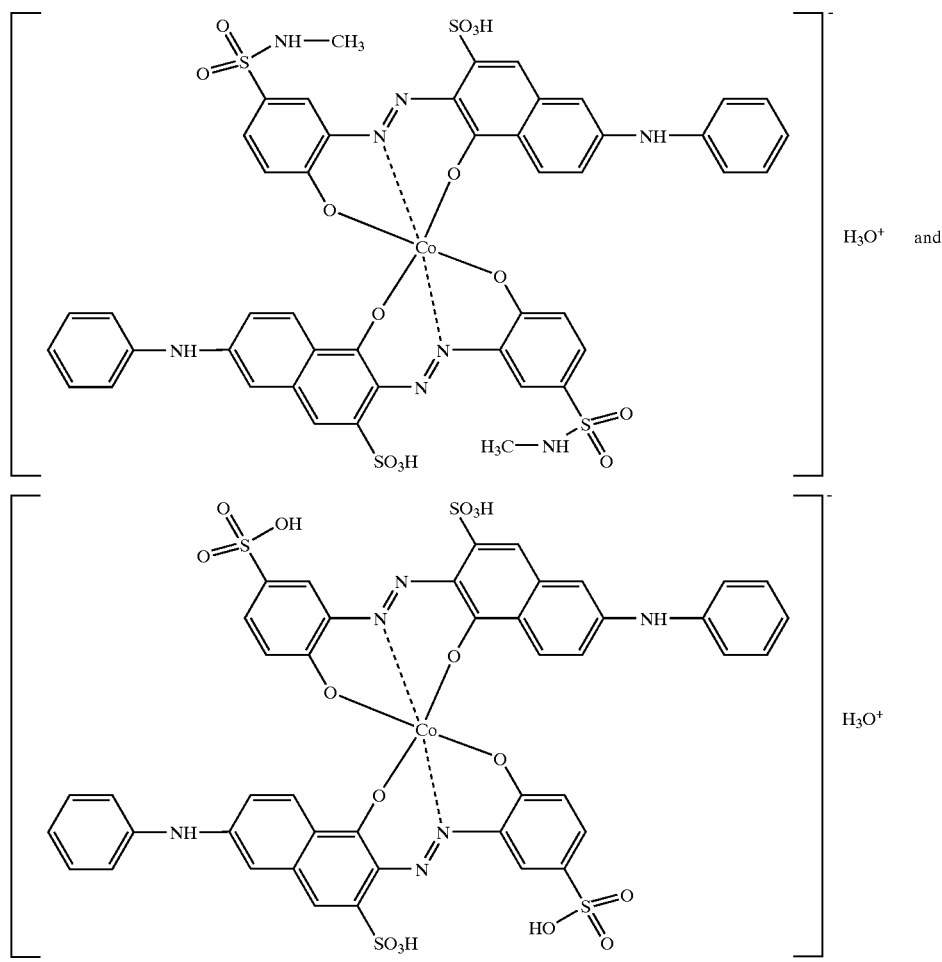

and is obtained as sodium salt.

EXAMPLE 2

The procedure described in Example 1 is repeated, but instead of using 28 parts of cobalt sulphate heptahydrate, only 14 parts thereof are used. After 1 hour of cobaltation, the pH is adjusted to 6.5 to 7.0 with 20 parts of hydrochloric acid, 15 parts of iron trichloride hexahydrate are added, keeping the pH at 4.5–5.0, if necessary by the addition of aqueous 25% NaOH solution, and the reaction mass is stirred one hour. Finally, the dye is salted out, suction filtered and dried. There is obtained 200 parts Of a dark powder that dyes leather in a red brown shade. The dye is a mixture of asymmnetric and symmetric cobalt complexes, which in the form of the free acids correspond to the formulae shown in Example 1, and of asymmetric and symmetric iron complexes, which in the form of the free acids correspond to the formulae

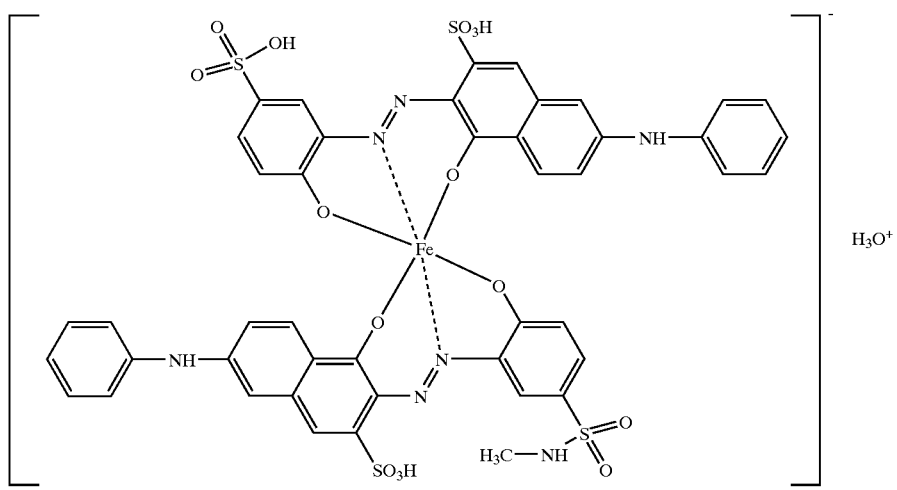

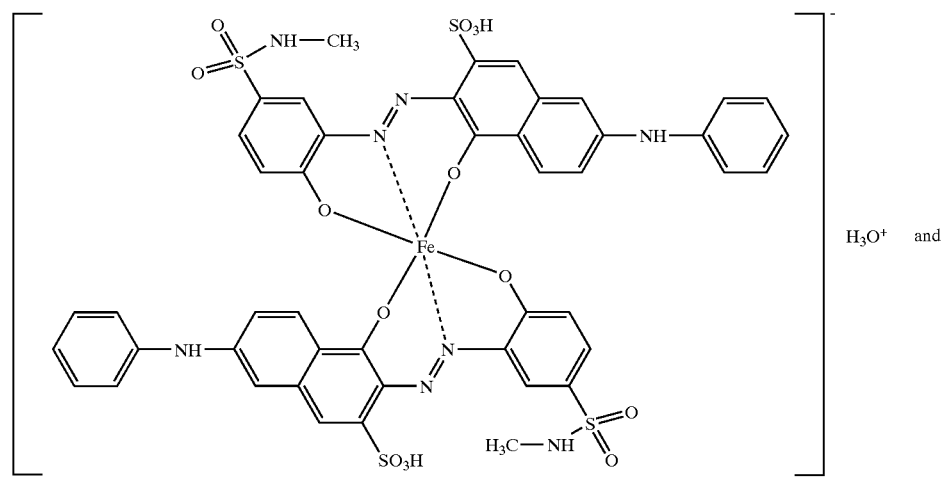
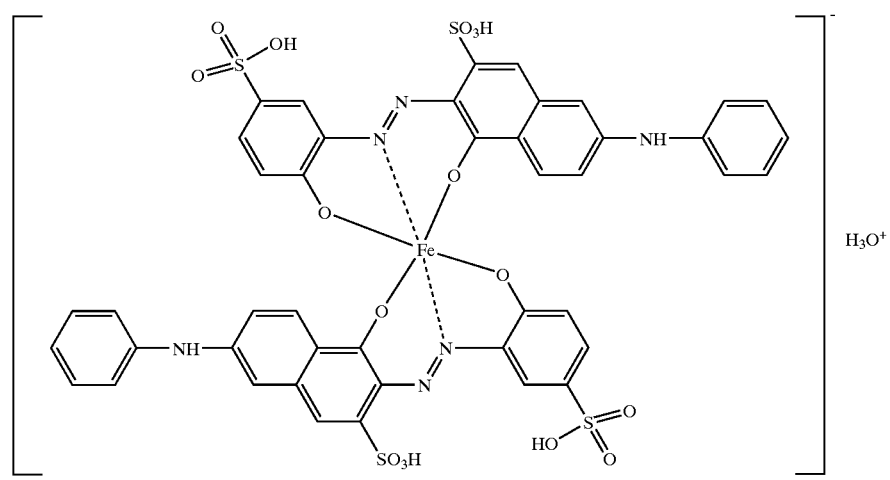
and is obtained as sodium salt.
The following table contains the above Examples 1 and 2 and further dyes (Examples 3–20) of the invention which are produced analogously to the methods described in Examples 1 and 2 and correspond in the form of the free acids to the formula
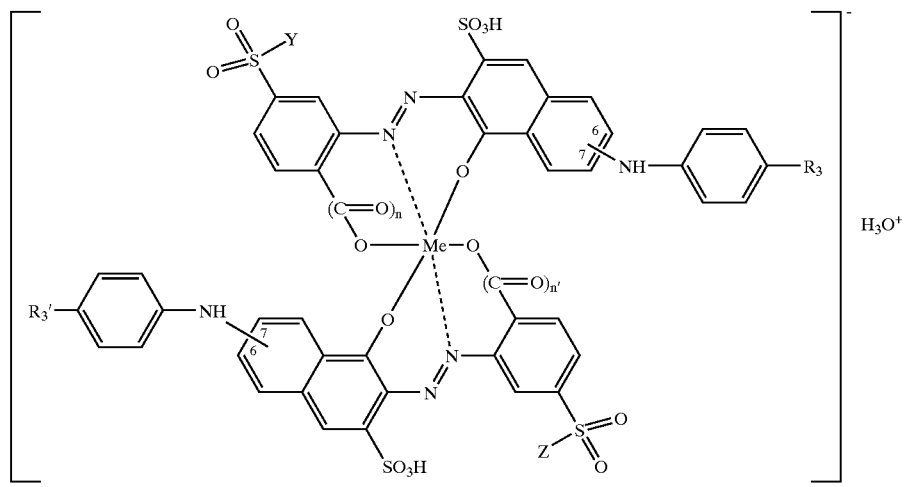

Chromation in Examples 3, 4, 8, 16 and 19 is carried out with chrome alum (potassium/chromium sulphate) at pH 5.0–5.5 at 95–100° C.

In the last column of the table there is indicated the shade of the dyeing on leather.

| Ex. Nr. | Y | Z | n = n' | Me and molar ratio | pos. | $R_3 = R_3'$ | Shade on leather |
|---|---|---|---|---|---|---|---|
| 1 | —OH | —NHCH$_3$ | 0 | Co | 6 | H | bordeaux |
| 2 | —OH. | —NHCH$_3$ | 0 | Co/Fe 50/50 | 6 | H | reddish brown |
| 3 | —OH | —NHCH$_3$ | 0 | Cr | 6 | H | bordeaux |
| 4 | —OH. | —NHCH$_3$ | 0 | Co/Cr 50/50 | 6 | H | red brown |
| 5 | —OH. | —NH$_2$ | 0 | Co | 6 | H | bordeaux |
| 6 | —OH. | —NH$_2$ | 0 | Fe | 6 | H | brown |
| 7 | —OH. | —NH$_2$ | 0 | Co/Fe 50/50 | 6 | H | red brown |
| 8 | —OH. | —NH$_2$ | 0 | Co/Cr 50/50 | 6 | H | red brown |
| 9 | —OH. | —NH$_2$ | 0 | Co | 7 | H | bordeaux |
| 10 | —OH. | —NH$_2$ | 0 | Co | 6 | —NO$_2$ | bordeaux |
| 11 | —NH$_2$ | —NHCH$_3$ | 0 | Co | 6 | H | bordeaux |
| 12 | —NH$_2$ | —NHCH$_3$ | 0 | Fe | 6 | H | brown |
| 13 | —OH | —NH—C$_6$H$_5$ | 0 | Co | 6 | H | bordeaux |
| 14 | —OH | 2-HOOC-C$_6$H$_4$-NH— | 0 | Co | 6 | H | bordeaux |
| 15 | —OH | —NH$_2$ | 0 | Co/Fe 95/5 | 6 | H | bordeaux |
| 16 | —OH | —NH$_2$ | 0 | Cr | 6 | H | brown |
| 17 | —OH | —NH$_2$ | 1 | Co | 6 | H | brown |
| 18 | —OH | —NH$_2$ | 1 | Co | 6 | —NO$_2$ | brown |
| 19 | —OH | —NH$_2$ | 1 | Cr | 6 | H | brown |
| 20 | —OH | —NH$_2$ | 1 | Co | 6 | —NO$_2$ | brown |

EXAMPLE 21

The procedure described in Example 1 is repeated, with the difference that instead of 18.8 parts of 1-hydroxy-2-amino-4-benzenesulphonic acid and 20.1 parts of 1-hydroxy-2-amino-4-benzene-methylsulfonamide there are employed equivalent amounts of 1-hydroxy-2-amino-6-nitro-4-benzenesulphonic acid and of 1-hydroxy-2-amino-6-nitro-4-benzenemethylsulfonamide. The obtained dye is a mixture of symmetric and asymmetric cobalt complexes, in which the asymmetric complex preponderates and corresponds in the form of the free acid to the formula:

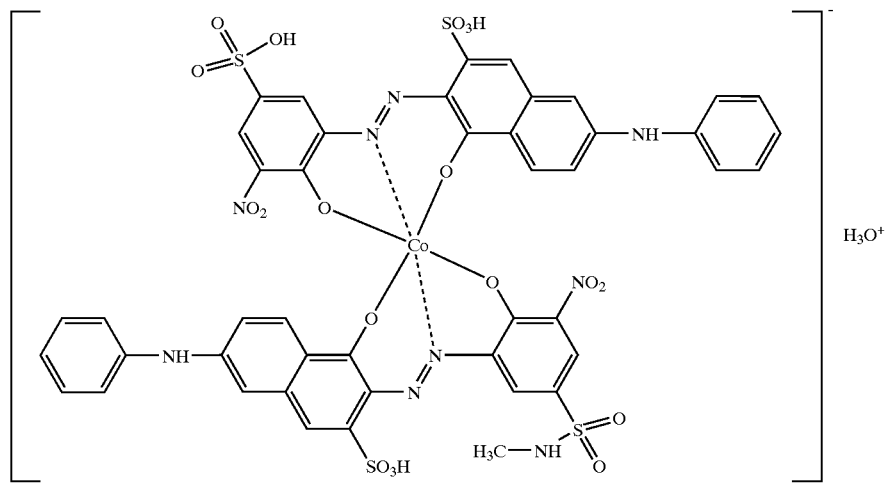

and the symmetric ones correspond in the form of the free acids to the formulae

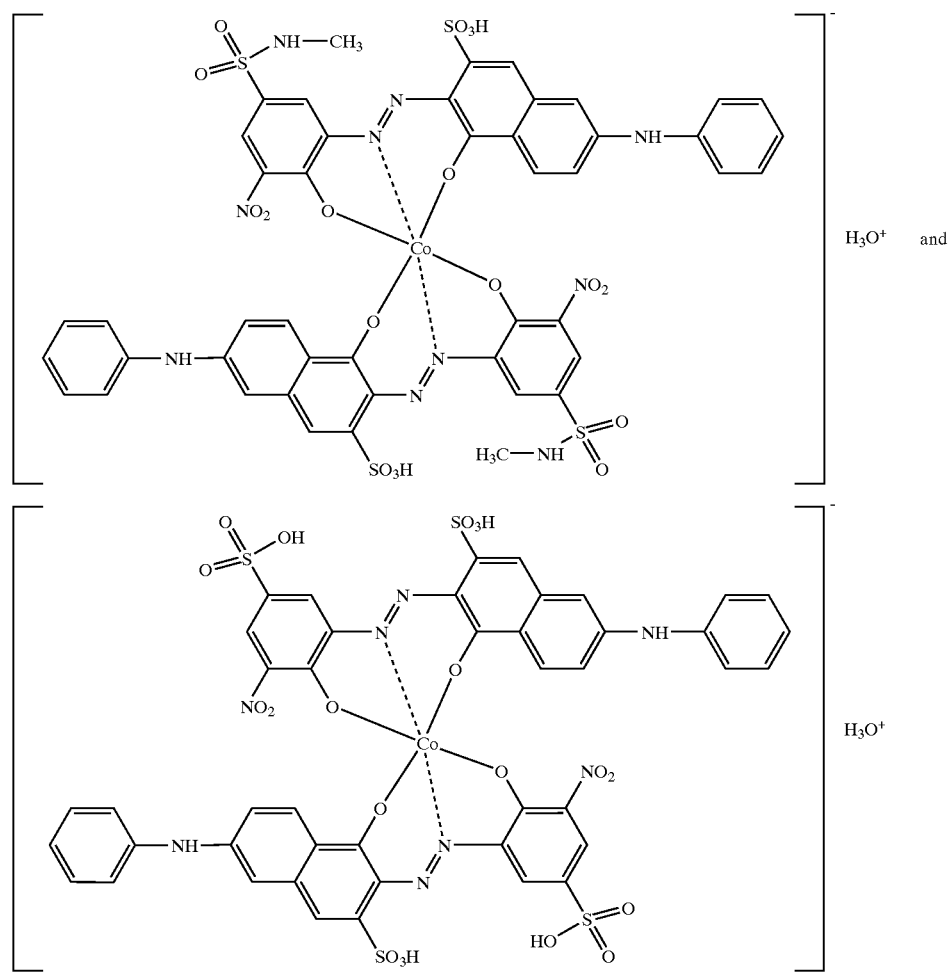

and is obtained as sodium salt. It dyes leather in bordeaux shades.

In the above Examples, the pH being set with NaOH and the dyes being salted out with sodium chloride, the dyes are obtained in sodium salt form. By salting out with KCl corresponding mixed Na/K-salts are obtained. By using corresponding bases for setting the pH (i.e. KOH or LiOH) and the respective salt for salting out the dyes are obtained in the corresponding K and Li salt forms. By precipitation of the dye by acid addition and neutralising with triethanolamine or ammonia, the corresponding amine or ammonium salt forms are obtained.

APPLICATION EXAMPLE A 100 parts of a wet blue bovine box side leather are neutralized in a dyeing drum with 250 parts of water and 0.8 parts of sodium bicarbonate at 35° C. during 45 minutes. The leather is then washed with 1000 parts of water at 25° C. After 5 minutes the leather is dyed at 50° C. with 250 parts of water and 0.8 parts of the metal complex dye produced according to Example 1, previously dissolved in 80 parts of water of 50° C. After 20 minutes 4 parts of an 80% emulsion of a sulphited fish oil are added for fatting and fatting is continued for 45 minutes. Then the bath is acidified with 0.5 parts of an 85% formic acid solution and drumming is continued for 20 minutes. Finally the liquor is drained off and the leather is rinsed at 25° C. with 1000 parts of water. The leather is drained, dried and cured in conventional way. A leather dyed with a level pastel bordeaux shade with outstanding fastnesses (in particular wet fastnesses, fastness to dry cleaning, fastness to acids, light fastness and PVC migration resistance) is obtained.

APPLICATION EXAMPLE B 100 parts of an intermediately dried chrome-tanned suede split leather are wetted back with 800 parts of water at 50° C., 2 parts of 25% ammonia solution and 0.5 parts of the adduct of 10 moles of ethylene oxide to 1 mol of nonylphenol for 90 minutes; the bath is then drained off and 600 parts of water at 50° C., 1 part of a 25% ammonia solution and 1 part of a fat-liquoring agent (an emulsion of fatty acid esters) are added. After 10 minutes, 4 parts of the metal complex dye produced according to Example 1, previously dissolved in 400 parts of water of 50° C., are added for pre-dyeing. After 60 minutes, 2 parts of an 85% fomic acid are added and drumming is continued for 20 minutes. 2 parts of a 20% solution of the product obtained by quaternization with dimethylsulphate of the benzylation product of diethylenetriamine are then added and after 20 minutes 2 parts of the same dyestuff as used for pre-dyeing, previously dissolved in 200 parts of water of 50° C., are added. Drumming is continued for 40 minutes, then the bath is acidified with two additions of 1.5 parts of an 85% formic acid solution at an interval of 10 minutes between the two additions. After 10 minutes the bath is drained off and the leather is rinsed, drained, dried and cured as usual. There is obtained a leather dyed in a level bordeaux shade with outstanding fastnesses (in particular wet fastnesses, fastness to dry cleaning, fastness to acids, light fastness and PVC migration resistance) and penetration.

APPLICATION EXAMPLE C 100 parts of chrome-tanned bovine upholstery leather are wetted back with 800 parts of water, 2 parts of a 25% ammonia solution and 3 parts of the adduct of 10 moles of ethylene oxide to 1 mol of nonylphenol at 50° C. during 90 minutes. The bath is then drained off and the leather is treated for 15 minutes with 400 parts of water at 40° C., 1.5 parts of a 25% ammonia solution, 2 parts of a fat-liquoring agent (an emulsion of fatty acid esters) and 1 part of a phenolic syntan (condensation product of phenol and sulphuric acid). 6 parts of the metal complex dye obtained in Example 1, previously dissolved in 600 parts of water of 50° C., are added and drumming is continued for 60 minutes. The bath is then acidified with two subsequent additions of 1.5 parts of an 85% formic acid solution, at an interval of 10 minutes. After 10 minutes the leather is rinsed, drained, dried and cured as conventional. There is obtained a leather dyed in an intense level bordeaux shade with outstanding fastnesses (in particular wet fastnesses, fastness to dry cleaning, fastness to acids, light fastness and PVC migration resistance).

APPLICATION EXAMPLE D 100 parts of chrome tanned bovine upholstery leather is wetted back with 800 parts of water, 2 parts of a 25% ammonia solution and 3 parts of the adduct of 10 moles of ethylene oxide to 1 mol of nonylphenol at 50° C. during 90 minutes. The liquor is then drained off and the leather is treated for 15 minutes with 400 parts of water at 40° C., 1.5 parts of a 25% ammonia solution, 2 parts of a fat-liquoring agent (an emulsion of fatty acid esters) and 1 part of a phenolic syntan (condensation product of phenol and sulphuric acid). The leather is then pre-dyed with 4 parts of the metal complex dye obtained in Example 1, previously dissolved in 400 parts of water of 50° C. After 60 minutes, the bath is acidified with 1 part of an 85% formic acid solution and, after 10 minutes, 2 parts of a 20% solution of the product obtained by quatemization with dimethylsulphate of the benzylation product of diethylenetriamine are added. The bath is drained off after 20 minutes and the leather is dyed at 50° C. with 400 parts of water and 2 parts of the same dyestuff as used before for pre-dyeing, previously dissolved in 200 parts of water of 50° C., for 40 minutes. The bath is then acidified with 1 part of an 85% formic acid solution and, after 20 minutes, the leather is rinsed, drained, dried and cured as conventional. There is obtained a leather dyed in an intense level bordeaux shade with outstanding fastnesses (in particular wet fastnesses, fastness to dry cleaning, fastness to acids, light fastness and PVC migration resistance) and full penetration.

APPLICATION EXAMPLE E 100 parts of low affinity chrome/vegetable tanned bovine leather is wetted back at 50° C. with 1000 parts of water and 0.2 parts of the adduct of 10 moles of ethylene oxide to 1 mole of nonylphenol during 90 minutes. The bath is then drained off and the leather is dyed at 50° C. with 1000 parts of water and 4 parts of the metal complex dye obtained in Example 1, previously dissolved in 400 parts of water of 50° C. After 1 hour, the bath is acidified with 2 parts of an 85% formic acid solution, and, after 20 minutes, the leather is rinsed, drained, dried and cured as conventional. There is obtained a leather dyed in a level bordeaux shade with outstanding fastnesses (in particular wet fastnesses, fastness to dry cleaning, fastness to acids, light fastness and PVC migration resistance).

APPLICATION EXAMPLE F 100 parts of semichrome sheep leather are wetted back at 45° C. with 1000 parts of water and 0.5 parts of an amphoteric masking agent (a sulpho group containing fatty acid aminoamide) for 1 hour. The leather is pre-dyed with 800 parts of water of 50° C. and 6 parts of the metal complex dye obtained in Example 1, previously dissolved in 600 parts of water of 50° C. Drumming is continued until the dye has penetrated inside the leather. The bath is then acidified with 1.5 parts of an 85% formic acid solution and, after 20 minutes, 2 parts of a 20% solution of the product obtained by quaternization with dimethylsulphate of the benzylation product of diethylenetriamine are added. After 20 minutes the leather is dyed with 6 parts of the same dye as used for pre-dyeing, previously dissolved in 600 parts of water of 50° C., for 40 minutes. The bath is then acidified with 2 parts of an 85% formic acid solution and after 30 minutes the leather is rinsed, drained, dried and cured as conventional. There is obtained a leather dyed in a level deep bordeaux shade with outstanding fastnesses (in particular wet fastnesses, fastness to dry cleaning, fastness to acids, light fastness and PVC migration resistance) and full penetration.

APPLICATION EXAMPLE G 100 parts of chrome tanned crust bovine leather for upholstery are wetted back at 35° C. with 300 parts of water and 0.5 parts of an amphoteric masking agent (a sulpho group containing fatty acid aminoamide) for 20 minutes. The bath is drained off an the leather is retanned at 35° C. with 150 parts of water, 1 part of a phenolic syntan (65% solution of the condensation product of phenol and sulphuric acid) and 3 parts of a 40% solution of dimethyloldihydroxyethylene urea. After 30 minutes 1.5 parts of sodium formate are added and, after 15 minutes 5 parts of a polypeptide-based retanning agent are added. Drumming is continued for 30 minutes and then the pH of the bath is set to 6 by addition of 1.5 parts of sodium bicarbonate. After 30 minutes the leather is washed for 10 minutes with 300 parts of water at 40° C. Then 150 parts of water at 45° C., 1 part of a fat-liquoring agent (an emulsion of fatty acid esters), 1 part of a 25% ammonia solution and 0.5 parts of a phenolic syntan (condensation product of phenol and sulphuric acid) are added. After 15 minutes the leather is dyed with 3 parts of the metal complex dye obtained in Example 1, previously dissolved in 300 parts of water of 50° C., during 90 minutes, i.e. until the dye has fully penetrated. 2 parts of an emulsion of fatty acid esters, 3 parts of a mixture of an esterified synthetic fatty alcohol and a phosphoric acid partial ester of an ethoxylated fatty alcohol and 6 parts of an emulsion of a sulphited fish-oil are added for fat-liquoring and, after 60 minutes, 2 parts of a hydrosoluble melamine-formaldehyde condensate are added for fixation. Drumming is continued for 20 minutes and then the bath is acidified with two additions of 0.75 parts of an 85% formic acid solution diluted with water 1:20 v/v, with an interval of 10 minutes between the two additions. After 10 minutes the leather is rinsed, drained, dried and cured as conventional. There is obtained a leather dyed in a level bordeaux shade with outstanding fastnesses (in particular wet fastnesses, fastness to dry cleaning, fastness to acids, light fastness and PVC migration resistance).

APPLICATION EXAMPLE H 100 parts of sheep nappa are washed 40° C. with 200 parts of water and 0.5 parts of an amphoteric masking agent (a sulpho group containing fatty acid aminoamide) for 20 minutes. The bath is drained off, 200 parts of water at 35° C. and 1.2 parts of sodium formate are added and drumming is continued for 15 minutes. 4 parts of a polypeptide-based retanning agent are then added and after 30 minutes 0.6 parts of sodium carbonate are added to adjust the pH of the bath to 5.8–6.0. After 40 minutes 4 parts of polyacrylic-acid-based retanning agent are added and drumming is continued for 30 minutes; 2 parts of a water-soluble urea/formaldehyde condensate are then added and after 30 minutes the bath is drained off. Then 150 parts of water at 40° C., 1 part of a 25% ammonia solution and 2 parts of a fat-liquoring agent (an emulsion of fatty acid esters) are added. After 10 minutes the leather is dyed with 3 parts of the metal complex dye obtained in Example 1, previously dissolved in 300 parts of water of 50° C., during 90 minutes. 2 parts of an emulsion of fatty acid esters, 6 parts of an emulsion of a sulphited fish-oil and 3 parts of an aqueous emulsion of fatty alcohol phosphoric acid partial esters are added for fat-liquoring. Drumming is continued for 60 minutes and then the bath is acidified with 1.5 parts of an 85% formic acid solution. After 30 minutes the bath is drained off and the leather is rinsed, drained, dried and cured as conventional. There is obtained a leather dyed in a level bordeaux shade with outstanding fastnesses (in particular wet fastnesses, fastness to dry cleaning, fastness to acids, light fastness and PVC migration resistance).

APPLICATION EXAMPLE I

Application Example H is repeated, with the difference that after fat-liquoring and before the conclusive formic acid addition the bath is drained off, 200 parts of water at 50° C. and 2 parts of a hydrosoluble polymeric reaction product of epichlorohydrin and dimethylamine are added, drumming is continued for 30 minutes, thereafter 0.5 parts of 2-fatty alkyl imidazoline are added and drumming is continued for further 20 minutes. The bath is then drained off and the leather is rinsed, drained, dried and cured as conventional. There is obtained a leather dyed in a level bordeaux shade with outstanding fastnesses (in particular wet fastnesses, fastness to dry cleaning, fastness to acids, light fastness and PVC migration resistance).

Analogously as the bordeaux dye according to Example 1, the dyes of each of Examples 2 to 21 are used in each of the above Application Examples A to I, by which there are also obtained dyeings of corresponding shades indicated in the table, depths and fastnesses.

What is claimed is:
1. A 1:2-metal complex dye of the formula

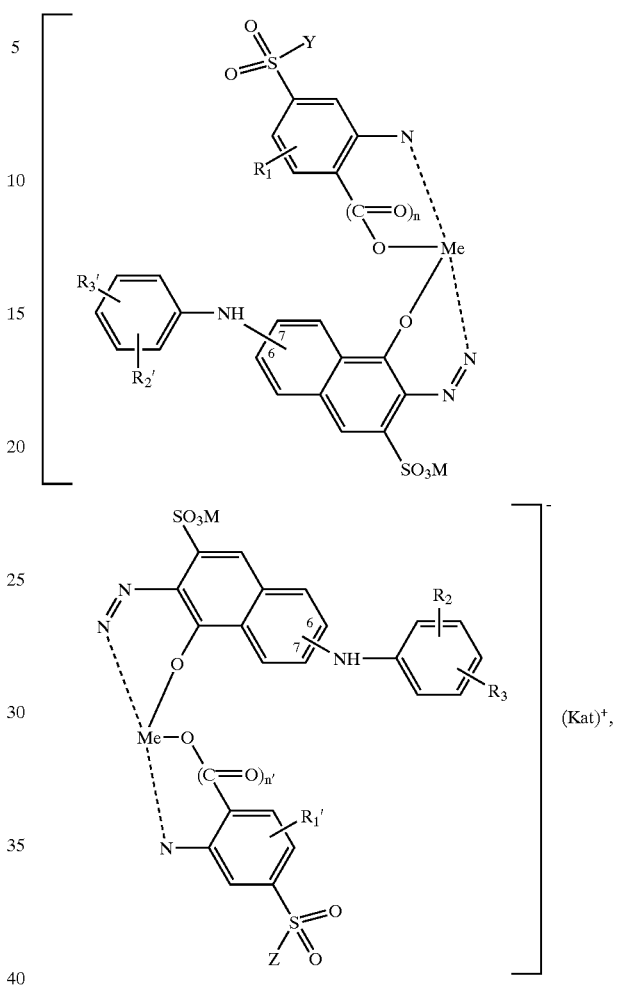

wherein
$R_1$ is H, —$NO_2$, —$SO_3M$ or —$NH(C_{1-2}$-alkyl),
$R_2$ is H, substituted $C_{1-4}$-alkyl, unsubstituted $C_{1-4}$-alkyl, —$NO_2$, or —OH,
$R_3$ is H, substituted $C_{1-4}$-alkyl, unsubstituted $C_{1-4}$alkyl, —$NO_2$, or —OH,
$R'_1$ is H, —$NO_2$, —$SO_3M$ or —$NH(C_{1-2}$-alkyl),
$R'_2$ is H, substituted $C_{1-4}$-alkyl, unsubstituted $C_{1-4}$-alkyl, —$NO_2$ or —OH,
$R'_3$ is H, substituted $C_{1-4}$-alkyl, unsubstituted $C_{1-4}$-alkyl, —$NO_2$, or —OH,
Y is —OM or —$NR_4R_5$,
Z is —OM or —$NR_4'R_5'$,
$R_4$ is H, $C_{1-4}$-alkyl, a substituted aromatic ring or an unsubstituted aromatic ring,
$R_4'$ is H, $C_{1-4}$-alkyl, a substituted aromatic ring or an unsubstituted aromatic ring,
$R_5$ is H, $C_{1-4}$-alkyl, a substituted aromatic ring or an unsubstituted aromatic ring,
$R_5'$ is H, $C_{1-4}$-alkyl, a substituted aromatic ring or an unsubstituted aromatic ring,
n is 0 or 1,
n' is 0 or 1,
M is hydrogen or a cation, (Kat)⁺ is a counter-ion and Me is a complex-forming metal, with the proviso that if Y and Z signify both $NH_2$, Me is not Cr.

2. A 1:2 metal complex dye according to claim 1, wherein $R_1$ is hydrogen or $-NO_2$, $R_1'$ is hydrogen or $-NO_2$, $R_2$ is hydrogen, $R_2'$ is hydrogen, $R_3$ is hydrogen, $-OH$ or $-NO_2$, $R_3'$ is hydrogen, $-OH$ or $-NO_2$, Y is hydrogen, $-OM$ or $-NHR_4''$, 3. A 1:2 metal complex dye or mixture according to claim 2, wherein Y is $-OM$ or $-NH_2$ and Z is $-NHR_4''$, and if Y is $-NH_2$, $R_4''$ in Z is not hydrogen.

4. Mixed 1:2 metal complexes comprising a mixture of an asymmetrical 1:2 metal complex of formula (I) according to claim 1, with the respective symmetrical 1:2 metal complexes of formulae

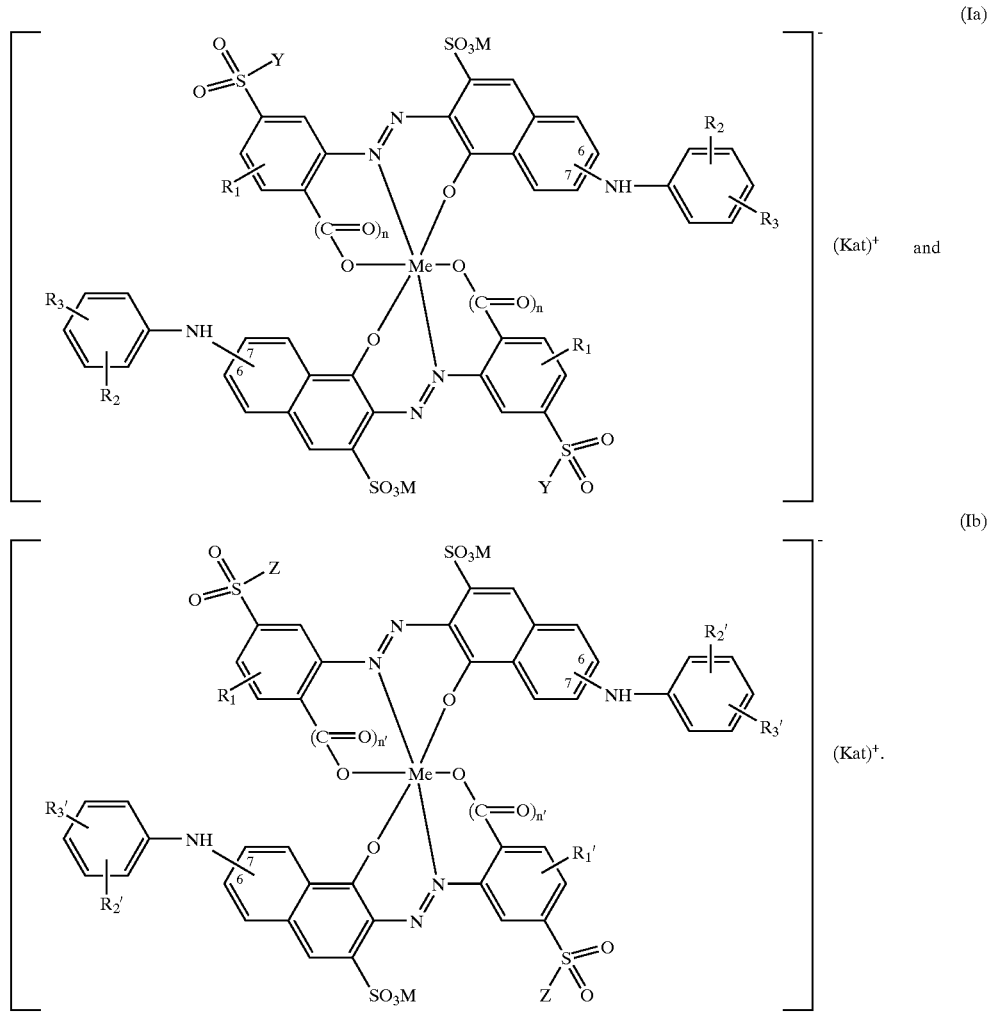

$R_4''$ is hydrogen, methyl or a radical of formula

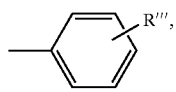

(α′)

$R'''$ is hydrogen or $-COOM_1$ and

Z is $-NHR_4''$, or a mixture of two or more thereof.

wherein $R_1$, $R_2$, $R_3$, $R'_1$, $R'_2$, $R'_3$, Y, Z, $R_4$, $R_4'$, $R_5$, $R_5'$, n, n', M, (Kat)⁺ and Me are as defined in claim 1, with the proviso that if Y and Z signify both $NH_2$, Me is not Cr.

5. A mixture of 1:2 metal complexes of formula (I) according to claim 1, wherein Me is two or more different complex-forming metals.

6. A process for the production of a 1:2 metal complex according to claim 1, comprising the step of metallizing at least one 1:2-complex-forming metal compound with at least one monoazo compound of formula

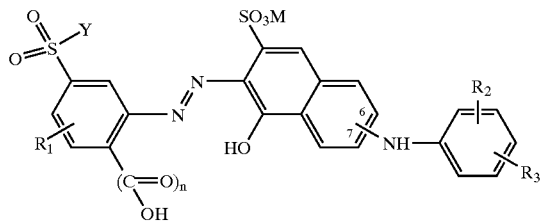
(II)

and at least one monoazo compound of formula

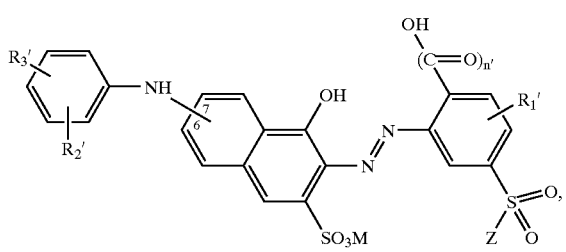
(III)

in which, when n or n' is 1, the carboxy group may optionally be in salt form.

7. A process for producing mixed 1:2 metal complexes comprising the step of metallizing a mixture of two or more different monoazo compounds of formulae (II)

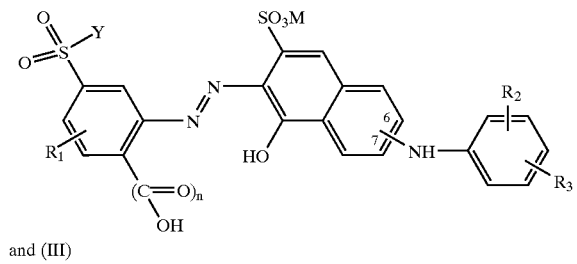
(II)

and (III)

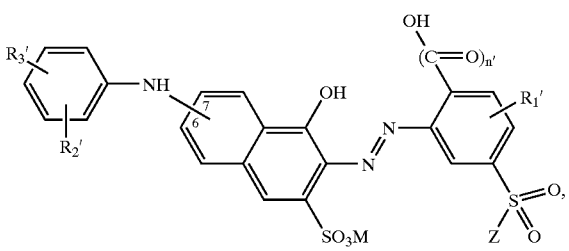
(III)

wherein $R_1$ is H, —$NO_2$, —$SO_3M$ or —$NH(C_{1-2}$-alkyl), $R_2$ is H, substituted $C_{1-4}$-alkyl, unsubstituted $C_{1-4}$-alkyl, —$NO_2$, or —OH, $R_3$ is H, substituted $C_{1-4}$-alkyl, unsubstituted $C_{1-4}$-alkyl, —$NO_2$, or —OH, $R'_1$ is H, —$NO_2$, —$SO_3M$ or —$NH(C_{1-2}$-alkyl), $R'_2$ is H, substituted $C_{1-4}$-alkyl, unsubstituted $C_{1-4}$-alkyl, —$NO_2$, or —OH, $R'_3$ is H, substituted $C_{1-4}$-alkyl, unsubstituted $C_{1-4}$-alkyl, —$NO_2$, or —OH, Y is —OM or —$NR_4R_5$, Z is —OM or —$NR'_4R'_5$, $R_4$ is H, $C_{1-4}$-alkyl, a substituted aromatic ring or an unsubstituted aromatic ring, $R'_4$ is H, $C_{1-4}$-alkyl, a substituted aromatic ring or an unsubstituted aromatic ring, $R_5$ is H, $C_{1-4}$-alkyl, a substituted aromatic ring or an unsubstituted aromatic ring, $R'_5$ is H, $C_{1-4}$-alkyl, a substituted aromatic ring or an unsubstituted aromatic ring, n is 0 or 1, n' is 0 or 1, M is hydrogen or a cation, and Me is a complex-forming metal, with the proviso that if Y and Z signify both $NH_2$, Me is not Cr, with at least one 1:2-complex-forming metal compound, to thereby form a corresponding mixture of an asymmetrical 1:2 metal complex of formula (I) according to claim 1, with the respective symmetrical 1:2 metal complexes of formulae (Ia) and of formula (Ib).

8. A process according to claim 7, wherein the respective monoazo compounds of formulae (II) and (III) are metallized with two or more different complex-forming metals, so that there are formed corresponding mixtures of the 1:2 metal complexes of formula (I) wherein Me is two or more different complex forming metal.

9. Dye composition comprising at least one dye of formula (I) according to claim 1.

10. A method for dyeing a substrate dyeable with anionic dyes comprising the step of applying to the substrate at least one 1:2-metal complex dye according to claim 1.

11. A method for dyeing leather dyeable with anionic dyes comprising the step of applying to the leather at least one 1:2-metal complex dye according to claim 1.

12. A substrate dyed by the process according to claim 10.

13. A mixture of 1:2-metal complex dyes comprising at least two 1:2-metal complex dyes according to claim 1.

14. Leather dyed by the process according to claim 11.

* * * * *